United States Patent
Koyama et al.

[11] Patent Number: 6,034,737
[45] Date of Patent: Mar. 7, 2000

[54] TV SET AND A COMBINATION APPARATUS OF A TV SET AND AN AV AMPLIFIER

[75] Inventors: Hiroshi Koyama; Hiroshi Masuda, both of Tokyo, Japan

[73] Assignee: Sony Corporation, Tokyo, Japan

[21] Appl. No.: 08/916,032

[22] Filed: Aug. 21, 1997

[30] Foreign Application Priority Data

Sep. 2, 1996 [JP] Japan ................. P08-250975

[51] Int. Cl.⁷ .............. H04N 7/00; H04N 11/00
[52] U.S. Cl. ............. 348/552; 348/553; 348/705; 455/6.3
[58] Field of Search ............ 348/552, 553, 348/705, 706, 707, 731, 10; 455/6.3

[56] References Cited

U.S. PATENT DOCUMENTS

| Re. 34,340 | 8/1993 | Freeman .................... 358/86 |
| 3,629,844 | 12/1971 | Dancis et al. .............. 348/552 |
| 4,841,367 | 6/1989 | Ichikawa et al. .......... 358/181 |
| 4,996,597 | 2/1991 | Duffield ..................... 358/181 |
| 5,012,328 | 4/1991 | Ishiguro ...................... 358/22 |
| 5,047,857 | 9/1991 | Duffield et al. ........... 348/553 |
| 5,287,186 | 2/1994 | Takamori ................... 348/705 |
| 5,305,105 | 4/1994 | Heo ............................. 348/485 |
| 5,329,371 | 7/1994 | Ueno ........................... 348/738 |
| 5,402,183 | 3/1995 | Tanaka ........................ 348/705 |
| 5,414,417 | 5/1995 | Heo ............................. 348/706 |
| 5,414,456 | 5/1995 | Oda et al. .................... 348/10 |
| 5,602,598 | 2/1997 | Shintani ..................... 348/565 |
| 5,631,712 | 5/1997 | Suh et al. ................... 348/552 |
| 5,719,635 | 2/1998 | Han ............................. 348/705 |
| 5,754,256 | 5/1998 | Kim ............................ 348/706 |
| 5,757,414 | 5/1998 | Thorne ......................... 348/10 |
| 5,838,393 | 11/1998 | Simpson et al. ............ 348/705 |

*Primary Examiner*—John K. Peng
*Assistant Examiner*—Linus H. Lo
*Attorney, Agent, or Firm*—Jay H. Maioli

[57] ABSTRACT

A TV set includes a tuner circuit that selects a channel and outputs video and audio signals from the channel, a first external output terminal for outputting the video signals a second external output terminal for outputting the audio signals a first external input terminal to which video signals are supplied from external AV devices, a first switch means for taking out video signals from the tuner circuit and video signals from the first external input terminal selectively, a second switch teamed with the first switch and taking out audio signals from the tuner circuit when the first switch selects the video signals from the tuner circuit, a display for displaying video signals output from the first switch as images, a speaker for outputting audio signals output from the second switch as sounds, and a control circuit for holding both first and second switches in the status for selecting video signals from the first external input terminal. When an AV amplifier is connected to this TV set, the AV amplifier is also connected to external AV devices and is used to carry out a processing for changing the sound fields of the audio signals supplied together with video signals both from the tuner circuit of the TV set and from the external AV devices.

2 Claims, 3 Drawing Sheets

TV SET AND A COMBINATION APPARATUS OF A TV SET AND AN AV AMPLIFIER

BACKGROUND OF THE INVENTION

This invention relates to a TV set or a combination apparatus of a TV set and an AV amplifier.

For example, when playing back a video disk, a circuit device called an AV amplifier is used as a means for playing back the sound field of reproduced signals more effectively. Basically, this AV amplifier changes the sound effect of played back audio signals from a VTR and a video disk to output those signals from speakers. For example, the AV amplifier is combined with other devices as shown in FIG. 1 or FIG. 2.

In other words, in FIG. 1, numeral 11 indicates a TV set, numeral 12 indicates a VTR, and numeral 13 indicates a video disk player. Numeral 14 indicates an AV amplifier.

When receiving a TV program, the user connects the switch 112 as shown in FIG. 1. In the tuner circuit 111, the target channel is selected and the video and audio signals of the channel are taken out from the tuner circuit 111. Then, the video signals are supplied to the CRT (Cathode Ray Tube) 113 via the switch 112 and displayed on the CRT as images. At this time, the audio signals from the tuner circuit 111 are supplied to the speaker 114. Thus, just like an ordinary TV set, the user can watch the TV program.

On the other hand, when the VTR 12 or the video disk player 13 is used, the user connects the switch 112 in a reverse fashion from the connection shown in FIG. 1. Then, the AV amplifier 14 selects either video and audio signals from the VTR 12 or video and audio signals from the video disk player 13.

The selected video signals from the VTR 12 or the video disk player 13 are then supplied to the TV set 11 from the AV amplifier 14. Furthermore, those signals are supplied to the CRT 113 via the switch 112 to display images. Selected audio signals are processed for surrounding effect, reverberant sounds, and echoes in the AV amplifier 13 and supplied to the right and left speakers 15L and 15R respectively.

Consequently, when using the VTR 12 or the video disk player 13, the user can watch the played back image on the CRT 113 of the TV set 11 and listen to the sounds from the speakers 15L and 15R effectively.

In the case that the AV amplifier 14 is provided with an OSD (On Screen Display) function, desired video signals are supplied from the AV amplifier 14 to the TV set 11, and the operation mode of the AV amplifier 14 and the parameters in the mode are displayed on the CRT 113 according to those video signals. Consequently, when parameters for playing back sound fields are to be set, the set values are displayed on the CRT 13, so that the user can check and set those parameters properly.

In the case of the combination as shown in FIG. 1, however, when watching a TV program, the user must select the target channel and connect the switch 112 as shown in the FIG. 1. This will be troublesome for the user. When using the VTR 12 or the video disk player 13, the user must also connect the switch 112 in a reverse fashion from the connection shown in FIG. 1 and operate the VTR 12 or the player 13. This will also be very troublesome for the user.

Furthermore, when watching a TV program on the TV set 11 of the combination as shown in FIG. 1, the AV amplifier 14 cannot be used effectively.

In FIG. 2, like in FIG. 1, an AV amplifier 14, to which a VTR 12 and a video disk player 13 are connected, is connected to a TV set 11. Furthermore, the AV amplifier 14 is connected to a tuner 16 equivalent to the tuner circuit 111. When watching a TV program, video and audio signals from the tuner 16 are used.

In the case of the configuration as shown in FIG. 2, it is not needed to change the connection of the switch 112 whether watching a TV program or for using the VTR 12 or the video disk player 13. Thus, the user is free of troublesome operations. Furthermore, when watching a TV program, the user can use the AV amplifier 14 effectively, obtaining more effective sound fields.

In the case of the configuration as shown in FIG. 2, however, another tuner 16 must be prepared, although the TV set 11 incorporates a tuner circuit 111. The whole cost of this configuration is more expensive than that of the configuration shown in FIG. 1.

For some apparatus, the switch 112 is made to keep a connection different from the connection shown in FIG. 2 when the TV set 11 is used independently. For such an apparatus, when the power is turned on, the connection of the switch 112 is forcibly brought to make a connection different from the connection shown in FIG. 2. Thus, in making the combination as shown in FIG. 2 by using such an apparatus, the connection of the switch 112 must be changed to the state as shown in FIG. 2 when the power is turned on for using the VTR 12 or the video disk player 13. This will also be very far from ease of operation.

Furthermore, for other apparatus, when the tuner circuit 111 changes channels, the switch 112 is also brought to make a connection to the tuner circuit 111 to validate the new channel. In the case that the tuner circuit 111 is misoperated in changing the channel in such an apparatus, the connection of the switch 112 must be brought to the state as shown in FIG. 2 for using the VTR 12 or the video disk player 13. This will also be far from ease of operation.

SUMMARY OF THE INVENTION

Under such the circumstances, it is an object of this invention to solve those problems.

This object can be achieved by providing a TV set comprising a tuner circuit 21 for selecting a channel and outputting video and audio signals from the channel, a first external output terminal 31 for outputting the video signals a second external output terminal 32 for outputting the audio signals a first external input terminal 33 to which audio signals are supplied from external AV devices, a first switching means for taking out video signals from the tuner circuit 21 and video signals from the first external input terminal 33 selectively, a second switching means interlocked with this first switching means 22 and taking out audio signals from the tuner circuit 21 when this first switching means 22 selects the video signals from the tuner circuit 21, a display 24 for displaying video signals output from the first switching means as images, a speaker 27 for outputting audio signals output from the second switching means 25 as sounds, and a means 35 for holding both first and second switching means 22 and 25 in the status for selecting video signals from the first external input terminal 33.

Consequently, video and audio signals from the tuner circuit and external AV devices are supplied to the AV amplifier, so that the sound field of those audio signals can be changed.

DETAILED DESCRIPTION OF THE PREFERRED EMBODIMENTS

Hereunder, the first embodiment of this invention will be described with reference to FIG. 3.

Figure 1:
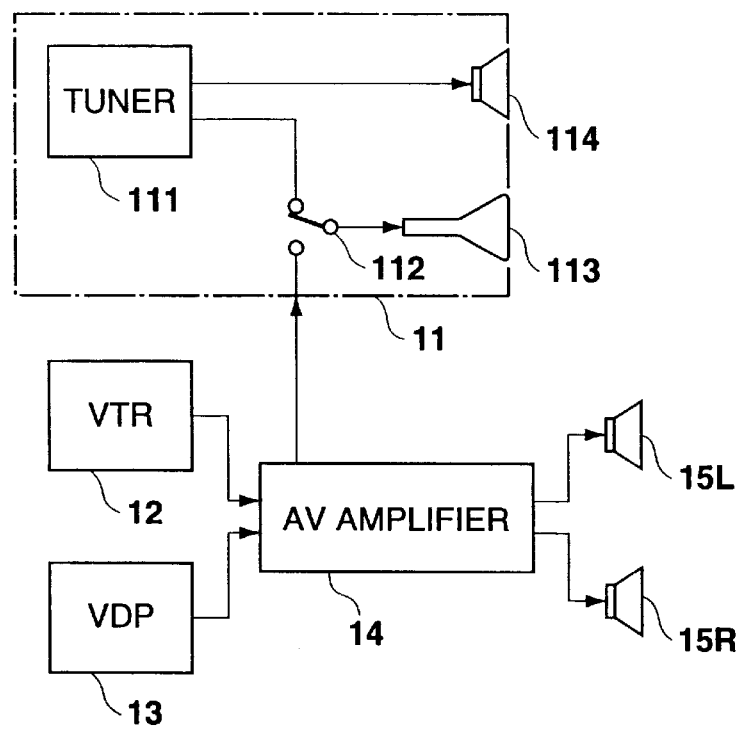
FIG. 1 is a connection diagram showing previously known audio/video system.
Figure 2:
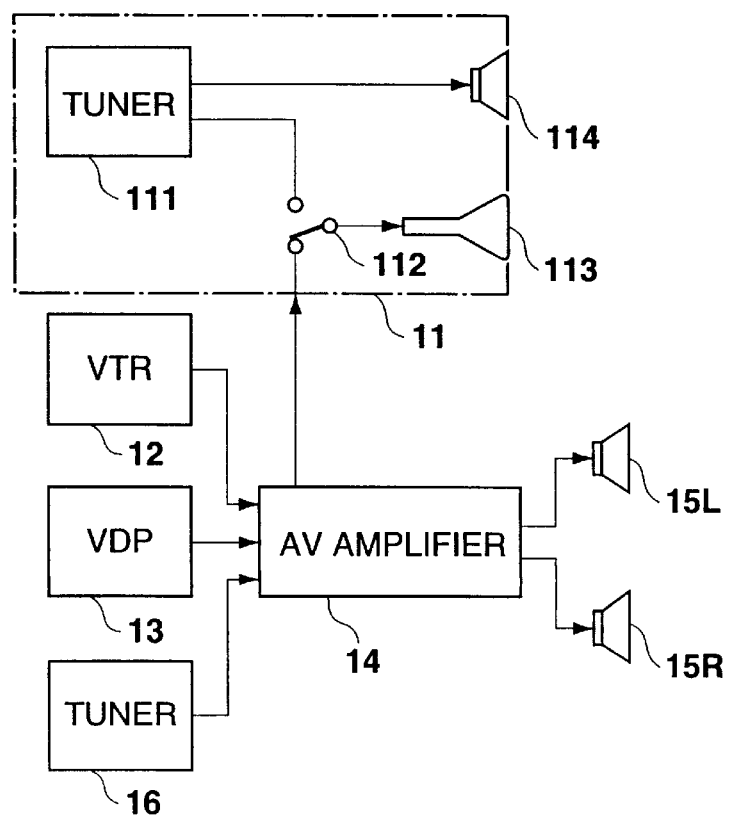
FIG. 2 is a connection diagram showing another previously known audio/video system.
Figure 3:
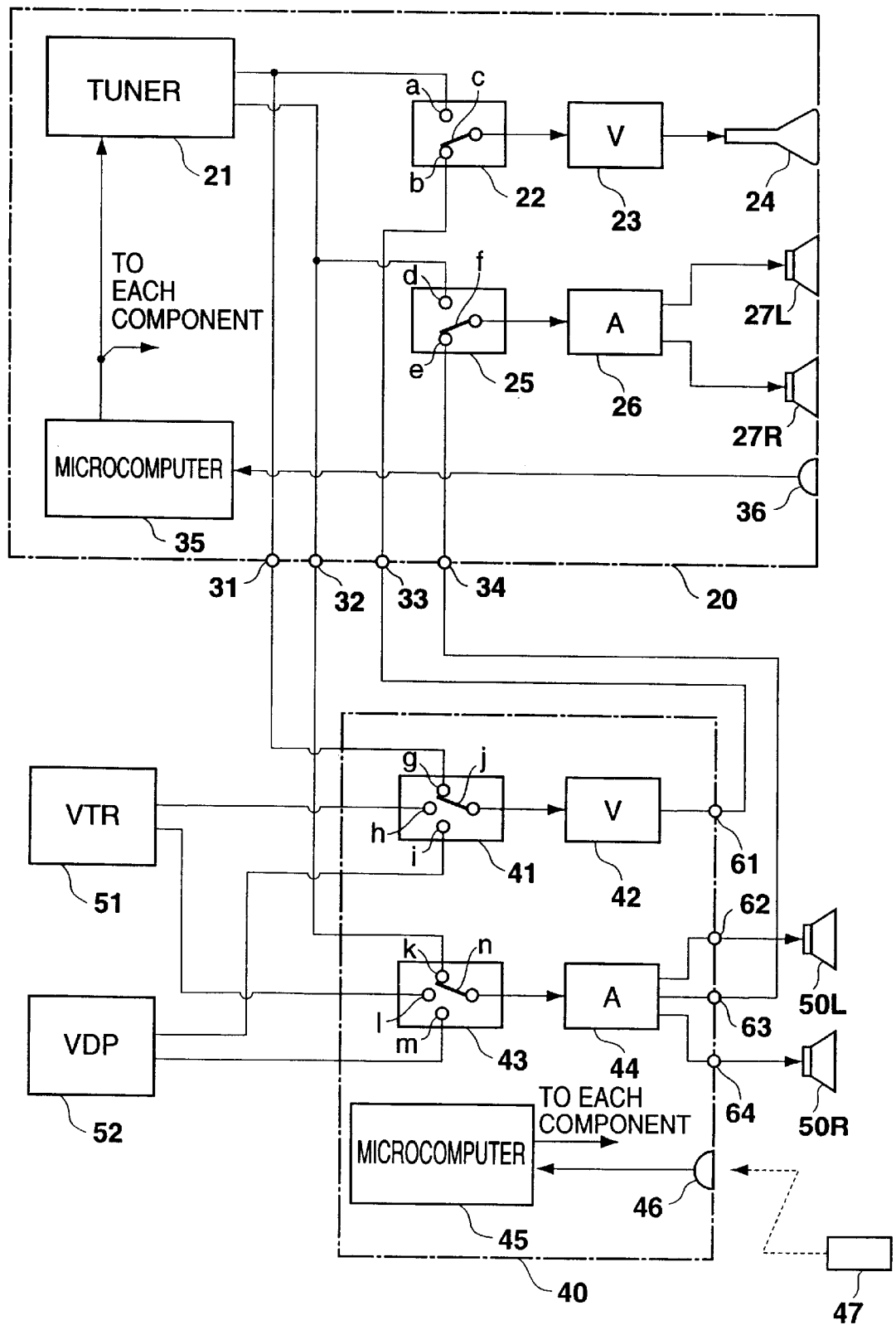
FIG. 3 is a connection diagram explaining an embodiment of this invention.

In FIG. 3, numeral 21 designates an embodiment of a TV set according to this invention. The TV set is provided with a tuner circuit 21, a video processing circuit 23, and a color CRT 24, for example, as a display element.

In this case, the tuner circuit 21 selects a channel and outputs video signals (composite signals of luminance and carrier color signals) and audio signals (stereo signals of right and left channels) of the selected channel according to the user operation. The video processing circuit 23 demodulates the three primary colors signals of red, green, and blue from the video signals and supplies those demodulated signals to the CRT 24.

Furthermore, the TV set 20 comprises a video signal switching circuit 22, an audio signal switching circuit 25, an audio processing circuit 26, and right and left speakers 27L and 27R. When supplied with audio signals, the audio processing circuit 26 amplifies the power of those audio signals and supplies the amplified signals to the speakers 27L and 27R.

Video signals from the tuner circuit 21 are taken out from the external output terminal 31 and audio signals from the tuner circuit 21 are taken out from the external output terminal 32 respectively. Furthermore, video signals are supplied to one fixed contact a of the video signal switching circuit 22 from the tuner circuit 21, while the other fixed contact b is connected to the external input terminal 33 and a movable contact c is connected to the video processing circuit. On the other hand, audio signals are supplied to one fixed contact d of the audio signal switching circuit 25, while the other fixed contact e is connected to the external input terminal 34 and a movable contact f is connected to the audio processing circuit 26.

The switching circuits 22 and 25 select one of a pair of video signals and one of a pair of audio signals supplied to them, respectively, by switching the connection of the movable contacts c and f. The selected signals are then supplied to the circuits 23 and 26.

Furthermore, the switching circuits 22 and 25, when set to default values, are connected in a reverse fashion from the connection shown in FIG. 3. Thus, when the TV set is delivered from the factory, the switches 22 and 25 are connected in a reverse fashion from the connection shown in the figure. In other words, the movable contact c of the switching circuit 22 is connected to the fixed contact a and the movable contact f of the switching circuit 25 is connected to the fixed contact d respectively.

Furthermore, the TV set 20 is also provided with a system control microcomputer 35. This microcomputer 35 supplies channel select signals to the tuner circuit 21 and control signals to the circuits 22, 23, 25, and 26.

Furthermore, the TV set 20 is also provided with a remote control signal receiving element, for example, an infrared light receiving element 36. This element 36 is used to receive infrared light signals from a remote control transmitter (not illustrated here). And the received signals are supplied to the microcomputer 35 and used to remote-control the TV set 20.

Furthermore, numeral 40 indicates an AV amplifier comprising switching circuits 41 and 43 for selecting inputted video and audio signals and a video processing circuit 42, and an audio processing circuit 44.

In this case, the video processing circuit 42 is provided with a buffer amplifier and used to output video signals selected by the switching circuit 41 to the input terminal 33 of the TV set 20 via the terminal 61. The audio processing circuit 44 processes audio signals selected by the switching circuit 43 to enhance the effects of sound field such as surrounding sounds, reverberant sounds, echoes, delays, matrixes, and frequency characteristics. Processed audio signals are then supplied to the right and left speakers 50L and 50R via the terminals 62 and 64.

Furthermore, audio signals of the center channel are taken out from the audio processing circuit 44 and the taken out audio signals are supplied to the input terminal 34 of the TV set 20 via the terminal 63. The speakers 50L and 50R are arranged on the right and left of the TV set when viewed from the user side.

Furthermore, the AV amplifier 40 is provided with a system control microcomputer 45, from which control signals are supplied to the circuits 41 to 44 respectively. Control signals supplied to the audio processing circuit 44 are used to control parameters of processing items such as surrounding sounds, reverberant sounds, echoes, delays, matrixes, and frequency characteristics.

The AV amplifier 40 is also provided with a remote control signal receiving element, for example, an infrared light receiving element 46. This element 46 is used to receive infrared signals from the remote control transmitter 47 and the received signals are supplied to the microcomputer 45 and used to remote-control the AV amplifier 40.

The fixed contact g of the video signals switching circuit 41 of the AV amplifier 40 is connected to the external output terminal 31 of the TV set 20, while video signals from the VTR 51 are supplied to the fixed contact h and video signals from the video disk player 52 are supplied to the fixed contact i. The movable contact j is connected to the video processing circuit 42. The fixed contact k of the audio signal switching circuit 43 of the AV amplifier 40 is connected to the external output terminal 32 of the TV set 20. The fixed contact 1 is supplied with audio signals from the VTR 51 and the fixed contact m is supplied with audio signals from the video disk player 52 respectively. The movable contact n is connected to the audio signal processing circuit 44.

When the TV set 20 is used independently in such a configuration, the TV set 20 can be used just like an ordinary TV set. In other words, when delivered from the factory, the switching circuits 22 and 25 are connected in a reverse fashion from the connection shown in FIG. 3. The movable contact c of the switching circuit 22 is connected to the fixed contact a and the movable contact f of the switching circuit 25 is connected to the fixed contact d. (When the switching circuit is connected as shown in FIG. 3, for example, when a key (not illustrated) of the TV set 20 is operated, the micro computer 35 outputs control signals and the control signals are used to drive the switching circuits 22 and 25 to be connected in a reverse fashion from the connection as shown in FIG. 3. The microcomputer 35 holds the data for connecting this movable contact c to the fixed contact a and the movable contact f to the fixed contact d respectively. This status is kept until it is reset by the user.)

When the switching circuits 22 and 25 are connected, in a reverse fashion from the connections shown in the figure, video and audio signals from the tuner circuit 21 are supplied to the video processing circuit 23 and the audio processing circuit 26 via the switching circuits 22 and 25. Furthermore, those video and audio signals are also supplied to the CRT 24 and the speakers 27L and 27R respectively. Consequently, the user can watch the TV program of the channel selected by the tuner circuit 21. In other words, the user can use the TV set 20 independently.

On the other hand, when it is intended to use the TV set 20 in combination with the AV amplifier 40, these devices must be connected as shown in the figure. The user operates a proper key of, for example, the TV set 20 corresponding to this connection state.

Then, control signals are taken out from the microcomputer 35 and the movable contact c of the switching circuit 22 is connected to the fixed contact b and the movable contact f of the switching circuit 25 is connected to the fixed contact e respectively according to the control signals. The microcomputer 35 holds the data for enabling these connections and the connections are kept until they are reset by the user.

Video and audio signals from the tuner circuit 21 are supplied to the switching circuits 41 and 43 of the AV amplifier 40 via output terminals 31 and 32. Video and audio signals from the AV devices 51 and 52 are supplied to the switching circuits 41 and 43 of the AV amplifier 40.

When a key (not illustrated) of the AV amplifier 40 or the remote control transmitter 47 is operated, the switching circuits 41 and 43 are teamed to switch the connection together according to the control signals from the microcomputer 45. Consequently, video and audio signals output from the tuner circuit 21 and the AV devices 51 and 52 and corresponding to the key operation are selected and taken out.

Video signals taken out from the switching circuit 41 are supplied to the input terminal 33 of the TV set 20 via the video processing circuit 42, and then supplied to the video processing circuit 23 via the fixed contact b and movable contact c of the switching circuit 22. Thus, of the video signals from the tuner circuit 21 and the AV devices 51 and 52, the images of the video signals selected by the switching circuit 41 are displayed on the CRT 24.

Furthermore, the audio signals taken out from the switching circuit 43 are supplied to the audio processing circuit 44 and processed as required at this time. Then, the processed audio signals are supplied to the speakers 50L and 50R. On the other hand, audio signals of the center channel are taken out from the audio processing circuit 44 and supplied to the input terminal 34 of the TV set 20. Furthermore, those audio signals entered to the TV set 20 are supplied to the audio processing circuit 26 via the fixed contact e and the movable contact f of the switching circuit 25.

Consequently, sounds reproduced according to the audio signals selected by the switching circuit 41 from the audio signals are output from the tuner circuit 21 and the AV devices 51 and 52, that is, the sounds reproduced according to the audio signals paired with the video signals displayed on the CRT 24 as images are output from the speakers 50L, 50R, 27L, and 27R. Thus, the TV set 20 and the AV amplifier 40 can be combined for use.

In this case, the remote control transmitter 47 can be used to have the light receiving elements 36 and 46 receive infrared signals output from itself, so that channel changes of the TV set 20 and input changes of the AV amplifier can be remote-controlled.

The TV set 20 shown in FIG. 3 can be used both independently and together with the AV amplifier 40 in such a way, but the switching circuits 22 and 25, once switched over according to whether the TV set 20 is used independently or combined with the AV amplifier, are not needed to be switched over thereafter. Thus, no additional operation is required thereafter for playing back TV programs, VTR 12 or video disks. This will make the apparatus advantageous in ease of operation.

Furthermore, when the switching circuits 22 and 25 are connected as shown in FIG. 3, the state of the connection is maintained. Thus, there is no need of changing the connections of those switching circuits 22 and 25 as shown in FIG. 3 after the power is turned on and channels are changed. This will also make the apparatus advantageous in ease of operation.

Not only when using a VTR 12 or a video disk player 13, but also when watching a TV program, the user can use the AV amplifier 14 more effectively and obtain more effective sound fields. Furthermore, since the user can use the tuner circuit 21 built in the TV set 20, there is no need for another tuner.

Furthermore, one remote control transmitter 47 can remote-control both the AV amplifier 40 and the TV set 20, so a remote control transmitter attached to the TV set 20 is not needed.

Hereunder, this invention's second embodiment will be described with reference to FIG. 4.

Figure 4:
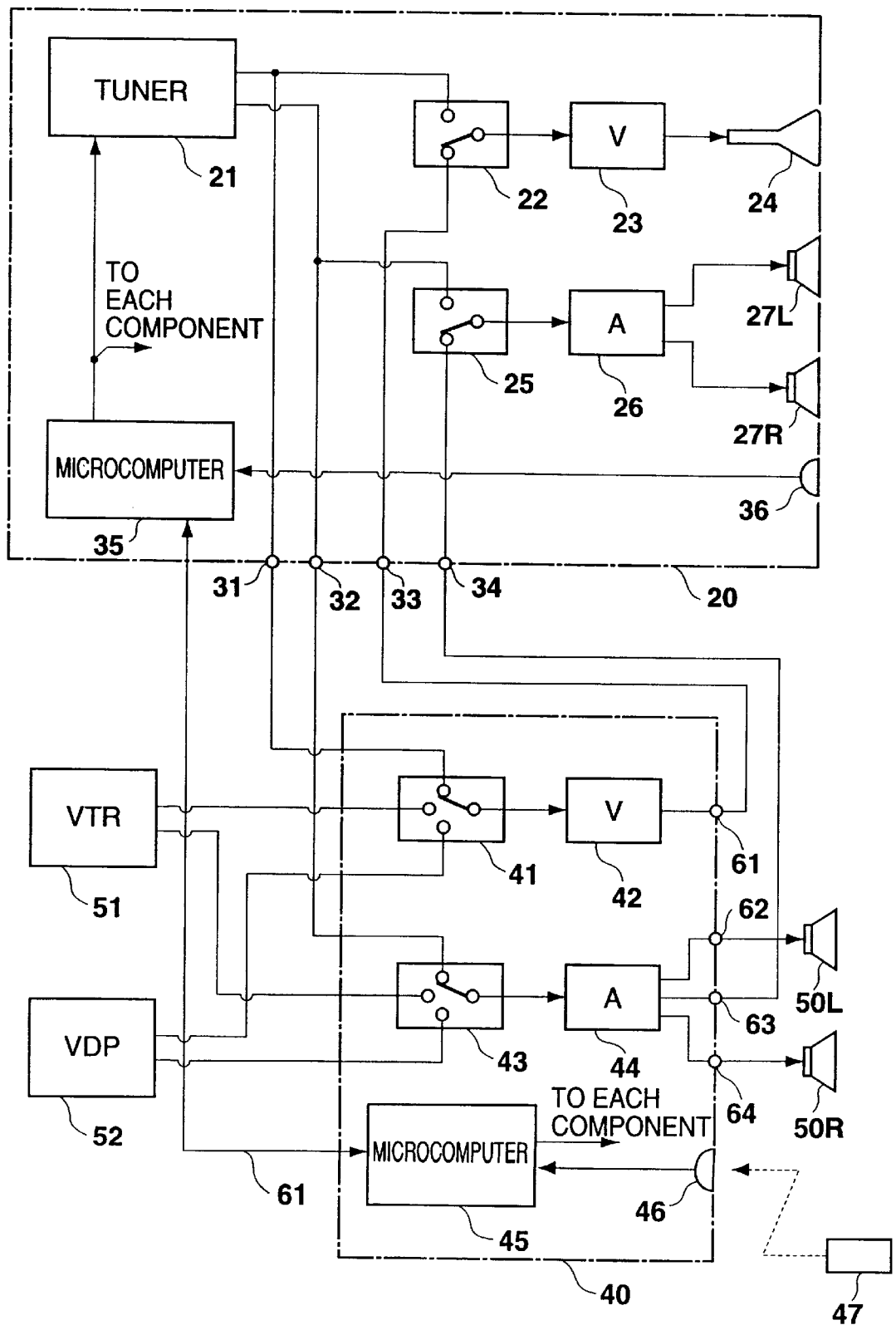
FIG. 4 is a connection diagram explaining another embodiment of this invention.

In the embodiment shown in FIG. 4, the microcomputer 35 of the TV set 20 and the microcomputer 45 of the AV amplifier 40 are connected via a communication line 61. In FIG. 4, the same components as those in FIG. 3 are given the same numerals and omitting detailed explanation for them.

In the second embodiment of this invention, even when the TV set 20 is made to be independently used with connections of the switching circuits 22 and 25 made to be different from those shown in FIG. 4 and the inputs to the terminals 33 and 34 being invalidated, channel changing operation with the remote control transmitter 47 of the AV amplifier 40 also changes the connections of the switching circuits 22 and 25 to return to those shown in FIG. 4 so that the AV amplifier 40 can be used effectively.

In other words, when the TV set 20 is used independently, the connections in the switching circuits 22 and 25 are in different states from those shown in FIG. 4. However, operations such as changing channel can be carried out by operating a key in the TV set 20 (not illustrated) or the remote control transmitter attached to the TV set 20.

When this TV set 20 is used with an AV amplifier 40 connected (combined) thereto, by a key operation of, for example, the remote control transmitter 47 for changing channels, infrared light signals from the transmitter 47 are received by the light receiving element 46, and the received signals are supplied to the microcomputer 45, and then the microcomputer 45 transmits specified data to the microcomputer 35 via the communication line 61. As a result, the microcomputer selects the target channel of the tuner circuit 21 and the microcomputer 35 changes the connections of the switching circuits 22 and 25 to the state shown in FIG. 4. Consequently, input signals to the terminals 33 and 24 are kept valid even after channels are changed by the remote control transmitter 47.

In this embodiment, when the TV set 20 is used independently, the remote control transmitter attached to the TV set 20 can be used to remote-control the TV set 20. When combined with an AV amplifier 40, the remote control transmitter 47 can also be used, so either of the remote control transmitters can be suitably used for the purpose.

By making use of the communication line 61, for example, when AV devices 51 and 52 are used, commands for changing the connections of the switching circuits 22 and 25 as shown in the figure can be sent via the communication line 61 and, when the TV set 20 stands by, power of the TV set 20 can be turned on via the communication line 61. When turning off the AV amplifier, the power-off (standby) command can be sent to the TV set 20 from the AV amplifier 40 via the communication line 61.

When the TV set 20 shown in FIG. 3 is formed so that when a remote control transmitter changes channels, the switching circuits 22 and 25 are connected in a reverse fashion from the connection shown in FIG. 3 and the input to the terminals 33 and 24 is invalidated, it is only needed to form the remote control transmitter 47 so that infrared light signals for changing the connections of the switching circuits 22 and 25 to the connections as shown in the figure are output after a channel change infrared light signal is output.

In FIG. 3, infrared light signals from the remote control transmitter 47 of the TV set 20 (and AV devices 51 and 52) are received by the light receiving element 36, then the received signals are supplied to the microcomputer 35. Alternatively, the TV set 20 can also be formed so that infrared light signals from the remote control transmitter 47 are received by the light receiving element 46 and the received signals are converted to remote control signals for the receiver 20 (or AV devices 51 and 52) in the microcomputer 45. These remote control signals are then converted to infrared light signals and supplied to the light receiving element 36 of the TV set 20 or the light receiving element of the (AV devices 51 and 52).

According to this invention, there is no need of changing over the switch between tuner output and external input whether the case is for watching TV programs or for using AV devices. Thus, the user is free of troublesome operations. Furthermore, the AV amplifier can also be used effectively to obtain more effective sound fields in watching TV programs.

Furthermore, since the tuner circuit built in the TV set can be used effectively, there is no need for another tuner. The user will also get free of operations for changing over the switch between tuner output and external input to the tuner output side. Thus, this will also make the apparatus advantageous in ease of operation.

What is claimed is:

1. A TV set, comprising:
   a tuner circuit for selecting a channel and outputting video and audio signals of a selected channel;
   a first external output terminal for outputting said video signals;
   a second external output terminal for outputting said audio signals;
   a first external input terminal to which video signals from external AV devices are supplied;
   first switching means for selectively taking out video signals from said tuner circuit and video signals from said first external input terminal;
   second switching means operably associated with said first switching means and taking out audio signals from said tuner circuit when said first switching means selects said video signals from said tuner circuit;
   a display for displaying images of said video signals output from said first switching means;
   means for producing sounds of said audio signals output from said second switching means;
   means for controlling respective selecting states of said first and second switching means for allowing both said first and second switching means to select video signals from said first external input terminal; and
   a second external input terminal to which audio signals from said external AV devices are supplied,
      said audio signals supplied to said second external input terminal and said audio signals from said tuner circuit being selectively taken out from said second switching means,
      wherein said means for producing sounds includes an audio/video (AV) amplifier and
      said first and second external output terminals and said first and second external input terminals are connected respectively to input terminals and output terminals of said AV amplifier,
   video and audio signals fed to said first and second external output terminals are supplied to said first and second switching means via said first and second external input terminals, and
   audio signals fed to said second external output terminal are processed in said AV amplifier, then supplied to external speakers.

2. A combination apparatus of a TV set, external AV devices, and an AV amplifier,
   said TV set comprising:
      a tuner circuit for selecting a channel and outputting video and audio signals of a selected channel;
      a first external output terminal for outputting said video signals;
      a second external output terminal for outputting said audio signals;
      first and second external input terminals to which video and audio signals from said external AV devices are supplied;
      first switching means for selectively taking out video signals from said tuner circuit and video signals from said first external input terminal;
      second switching means operably associated with said first switching means for selectively taking out audio signals from said tuner circuit and audio signals from said second external input terminal;
      a display for displaying images of said video signals output from said first switching means; and
      means for controlling respective connecting states of said first and second switching means for allowing both said first and second switching means to select video signals from said first external input terminal, and
   said AV amplifier being connected to said AV devices and comprising:
      third switching means for changing over between video signals from said first external output terminal of said TV set and video signal from said AV devices;
      fourth switching means for changing over between audio signals from said second external output terminal of said TV set and audio signals from said AV devices;
      a video processing circuit connected to said third switching means;
      an audio processing circuit connected to said fourth switching means;
      a connection terminal for taking out signals output from said video processing circuit and supplying said signals to said first external input terminal of said TV set; and
      means for producing sounds of said audio signals output from said audio processing circuit.

* * * * *